United States Patent [19]
von Wolffradt

[11] 3,970,192
[45] July 20, 1976

[54] NOZZLE APPARATUS FOR A CONVEYOR BELT SYSTEM

[75] Inventor: Carl von Wolffradt, San Marino, Calif.

[73] Assignee: Carl von Wolffradt, San Marino, Calif.

[22] Filed: Sept. 16, 1974

[21] Appl. No.: 506,396

[52] U.S. Cl. ............................... 198/230; 239/597
[51] Int. Cl.² ........................................ B65G 45/00
[58] Field of Search .................. 198/230, 185, 229; 239/597, 455

[56] References Cited
UNITED STATES PATENTS

| | | | |
|---|---|---|---|
| 1,248,565 | 12/1917 | Slattery | 239/597 |
| 1,793,246 | 2/1931 | Philips | 198/230 |
| 2,271,436 | 1/1942 | Lathrop | 198/229 |
| 3,630,453 | 12/1971 | Lane et al. | 239/597 |
| 3,680,684 | 8/1932 | Purdy et al. | 198/230 |

*Primary Examiner*—James B. Marbert
*Attorney, Agent, or Firm*—Jackson & Jones Law Corporation

[57] ABSTRACT

A conveyor belt fluid nozzle system includes apparatus for directing pressurized fluid such as air across the width of the conveyor belt to remove debris from the belt surface or from objects on the belt. The source of pressurized fluid such as an air compressor is attached to a plenum member. At least one elongated nozzle extends along the length of the plenum member substantially across the width of the conveyor belt. Auxiliary nozzles may be positioned on each side of the belt. The orifice of the nozzle member has a pair of resiliently biased blades that are adjustable to control the flow of the pressurized fluid.

11 Claims, 5 Drawing Figures

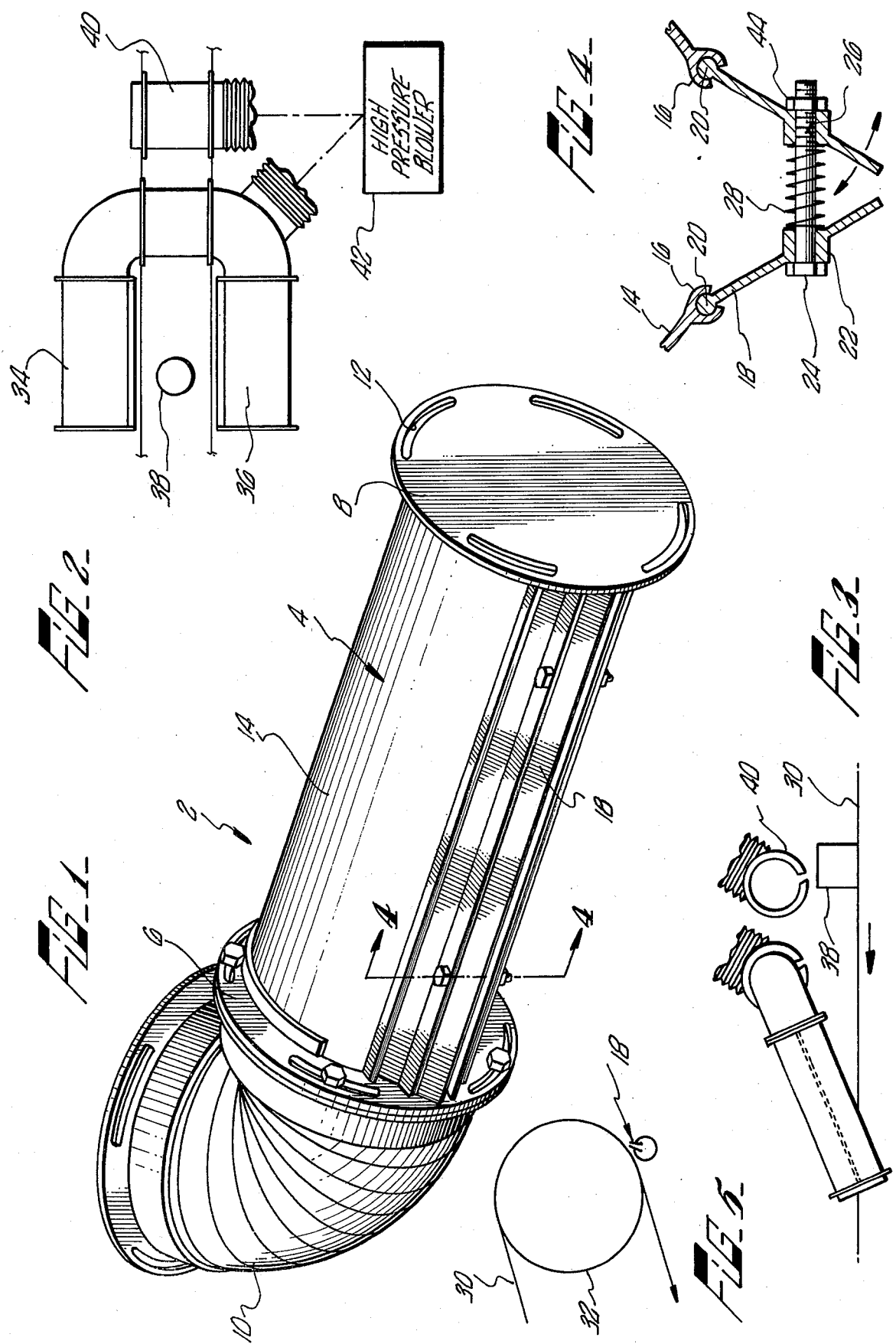

NOZZLE APPARATUS FOR A CONVEYOR BELT SYSTEM

BACKGROUND OF THE INVENTION

1. Field of the Invention

The present invention is directed to a fluid conveyor belt system and more particularly to nozzle apparatus for removing material from the surface of the conveyor belt.

2. Description of the Prior Art

Conveyor belt systems have been utilized extensively in various industrial applications. A recurrent problem associated with their use is the cleaning of the belt surface to remove any accumulation of undesired material.

The Harrison U.S. Pat. No. 1,235,027 is representative of the prior art and discloses one form of conveyor belt system. The conveyor belt is formed from wire cloth and air or steam is forced through the belt from the inner side of the conveyor envelope outwardly, threrby forcing any lint or fibres that have accumulated in the openings of the wire cloth free of the conveyor belt.

The Schwartz U.S. Pat. No. 986,226 discloses an apparatus for drying material wherein air is directed through the conveyor belt to lift material being carried by the conveyor thereby assisting the drying of the material.

The Capstaff U.S. Pat. No. 2,289,753 discloses a pair of high speed air nozzles directing jets of air at a film strip for removing excess liquid.

SUMMARY OF THE INVENTION

The present invention is directed to a conveyor belt system utilizing a continuously moving web member. At least one nozzle member is positioned adjacent the web member and connected to a plenum member which is in turn connected to a source of pressurized fluid. The nozzle member has an elongated slot orifice extending adjacent and substantially across the width of the web member for permitting the pressurized fluid to remove debris from the belt surface or from objects on the belt. Adjustment means is provided for varying the flow area of the slot orifice to control the impact of the pressurized fluid. Auxiliary nozzles may be positioned on either side of the belt. The slot orifice of the nozzle members is controlled by a pair of resiliently biased blades that are relatively movable.

The features of the present invention which are believed to be novel are set forth with particularity in the appended claims. The present invention, both as to its organization and manner of operation, together with further objects and advantages thereof, may best be understood by reference to the following description, taking in connection with the accompanying drawings.

BRIEF DESCRIPTION OF THE DRAWINGS

FIG. 1 discloses a perspective view of the nozzle assembly of the present invention;

FIG. 2 discloses a plan view of one embodiment of the present invention;

FIG. 3 discloses a partial cross sectional side view of the embodiment of FIG. 2;

FIG. 4 discloses a partial sectional side view of the nozzle embodiment of FIG. 1; and FIG. 5 discloses a schematic view of the present invention.

DESCRIPTION OF THE PREFERRED EMBODIMENT

Referring to FIGS. 1 and 4, a conveyor belt fluid system 2 includes a plenum member 4 having an elongated opening or slot adjacent one side. The plenum member 4 is tubular in shape and can be of case aluminum with flanges 6 and 8 located at either end. Flange 6 is adapted to be connected to a flexible hose member 10 which in turn can be connected to an appropriate fluid pressure source, such as an air compressor or high pressure blower 42. The flexible hose member 10 facilitates the positioning of the plenum member 4 relative to a conveyor belt. In FIG. 1, flange 8 serves the purpose of closing the plenum chamber. However, it should be understood that it can also be ported to permit the flow of pressurized fluid through flange 8. Peripheral slots 12 in each of the flanges 6 and 8 are provided to accommodate appropriate fastening devices, for example, to connect the hose member 10 to the plenum member 4.

The plenum tubular wall 14 includes an elongated opening as can be best seen in FIG. 4. At each side of the tubular wall 14 a cross sectional C shaped conduit 16 is provided. These conduits 16 are adapted to pivotally secure nozzle blades 18. The nozzle blades 18 have a bulbous base portion 20 which fits within the C shaped conduit 16. The nozzle blades 18 can be assembled onto the plenum member 4 by sliding the bulbous base portion 20 into the C shaped conduit 16 before the flange 6 is secured to the tubular wall 14.

A cross sectionally square rib or seat 22 is provided intermediate the width of each nozzle blade 18. A plurality of threaded shafts 24 are cooperatively positioned within an appropriate threaded port 26 through each rib 22 of the nozzle blades 18. A spring 28 is operatively positioned about the threaded shaft 24 and seats against the appropriate rib 22 on each nozzle blade 18. The spring 28 biases the nozzle blades 18 to an open position. By the appropriate manipulation of the threaded shafts 24, the nozzle blades 18 can be adjusted to provide the optimum flow area for the release of air between the respective nozzle blades 18.

Referring specifically to FIGS. 4 and 5, in one application of the invention, the center line of the nozzle blades 18 is optimumly positioned within the range of a 30 degree arc extending counter to the movement of a web member 30 from the point of contact with the pulley 32. This is an optimum position for removing debris from the surface of the web as it reaches one end of its travel. The relative height of the nozzle blades 18 from the surface of the web 30 is adjustable within the parameters of the particular web belt conditions.

Referring to FIG. 2, a plan view and an alternative embodiment of the present invention is disclosed wherein a second nozzle member 34 and a third nozzle member 36 are positioned at an acute angle adjacent the sides of the web member. The nozzle members are identical to the embodiment disclosed in FIG. 1 and are arranged to direct a curtain or stream of pressurized fluid across the surface of the web member for removing particulate material from an object. For example, liquid can be removed from a can 38 as it travels on the web member. Auxiliary nozzle member 40 is disclosed positioned upstream from the combined nozzle members. The combined nozzle members form a U shaped configuration as can be seen in the plan view.

In lieu of or supplementing the threaded ports 26, a threaded retainer 44 can be utilized to move the blades 18.

In operation, the air compressor or high pressure blower 42 can be regulated to the desired output and the nozzle blades 18 can be adjusted to the optimum flow pattern. For example, if a can 38 has been dipped in liquid and it is desired to remove the liquid, the upper nozzle members, such as member 40 in FIG. 3 will remove the liquid from the top of the can 38. The side nozzle members 34 and 36 are positioned at an acute angle to the plane containing the moving surface of the web 30. Their appropriate nozzle blades 18 are adjusted to force the liquid from the sides of the can 38 as it travels the effective length of the nozzle blades 18.

While the preferred embodiment of the present invention has been disclosed, it should be recognized that various modifications would be apparent to an artisan skilled in the art and accordingly the scope of the invention should be determined solely from the following claims:

What is claimed is:

1. In a conveyor belt system having a continuous movable web member and means for moving the web member, the improvement including apparatus for removing material such as debris from the belt comprising:
    a source of pressurized fluid;
    a plenum member connected to the source of pressurized fluid having an elongated opening;
    at least one first nozzle member, including a pair of relatively movable elongated blades capable of forming between the blades an elongated slot orifice extending adjacent and substantially across the width of the web member;
    means on either side of the plenum member elongated opening for pivotally attaching a respective elongated blade, and
    means for adjusting a flow area of the slot orifice by a pivoted displacement of at least one elongated blade whereby the impact of the pressurized fluid directed by the nozzle member against the web member removes material from the belt.

2. The invention of claim 1 wherein the means for moving the web member includes at least one pulley member and the nozzle member is positioned within a 30° arc extending counter to the movement of the web member from the point that the web member leaves the pulley in the direction of the web contacting surface of the pulley.

3. The invention of claim 1 wherein the means for pivotally attaching the nozzle blades includes a pair of cross sectional C shaped conduits and each of the nozzle blades have a bulbous base portion movably engaged within the C shaped conduits.

4. The invention of claim 1 further including second and third side nozzle members directing pressurized fluid across the surface of the belt and connected to the first nozzle member to form a U shaped configuration.

5. The invention of claim 3 wherein the means for adjusting the flow area of the orifice includes at least one spring positioned between the nozzle blades.

6. The invention of claim 5 wherein the means for adjusting further includes at least one threaded shaft and a threaded retainer member movable on the shaft.

7. The invention of claim 6 wherein a flexible hose member connects the source of pressurized fluid to the plenum.

8. The invention of claim 6 wherein each nozzle blade includes a cross sectionally square rib that seats the spring.

9. The invention of claim 1 further including at least one flange plate positioned at one end of the housing member to prevent the removal of the blades.

10. In a conveyor belt system for removing material having a continuous movable web member, means for moving the web member, and a source of pressurized fluid, the improvement including a nozzle member comprising:
    a housing member adapted to being connected to the source of pressurized fluid, having an elongated opening on at least one side thereof and a pair of cross sectional C shaped conduits adjacent the opening;
    a pair of elongated blades, each of the blades having a bulbous base portion movably engaging a respective C shaped conduit for varying the flow area; and
    means for adjusting the relative position of the blades to control the flow area between said blades.

11. The invention of claim 10 wherein the means for adjusting the blades include a projecting seat member on each blade, a spring and shaft, the shaft being capable of relatively moving the blades while the spring contacts the seat members and bias the blades away from each other.

* * * * *